United States Patent [19]

Tanaka et al.

[11] Patent Number: 4,855,754
[45] Date of Patent: Aug. 8, 1989

[54] CONTROL DEVICE FOR AN IMAGE RECORDER

[75] Inventors: Hidetake Tanaka; Yasushi Nakazato, both of Tokyo, Japan

[73] Assignee: Ricoh Co., Ltd., Tokyo, Japan

[21] Appl. No.: 74,280

[22] Filed: Jul. 16, 1987

[30] Foreign Application Priority Data

Jul. 21, 1986 [JP] Japan ............................ 61-110631[U]

[51] Int. Cl.⁴ ................................ G01D 9/00
[52] U.S. Cl. ...................................... 346/17; 355/206; 355/308; 346/160
[58] Field of Search .................... 355/14 C, 14 CU; 400/53; 371/24; 364/900, 551; 346/17

[56] References Cited

U.S. PATENT DOCUMENTS 4,062,061 12/1977 Batchelor ............................ 355/14 C
4,266,294 5/1981 Daughton et al. ................. 364/900
4,496,237 1/1985 Schron ............................... 355/14 C

FOREIGN PATENT DOCUMENTS 59-73983 4/1984 Japan.

Primary Examiner—E. A. Goldberg
Assistant Examiner—Lincoln Donovan
Attorney, Agent, or Firm—Cooper & Dunham

[57] ABSTRACT

A control system for a laser printer and other image recorders stores history data including the number of prints produced by a photoconductive element and occurrences of various kinds of failures, and displays the history data at suitable timings. The control system, therefore, displays data which may be referenced in the event of a failure of the image recorder.

2 Claims, 3 Drawing Sheets

CONTROL DEVICE FOR AN IMAGE RECORDER

BACKGROUND OF THE INVENTION

The present invention relates to a control device for an image recorder.

In a laser printer or like image recorder, it has been customary that upon the occurrence of a failure in the recorder the operation of the recorder is interrupted while, at the same time, the failure is displayed. When different kinds of failures occur at the same time, they are compared in terms of predetermined priority order so that only one of them which has priority over the others is displayed.

So long as the failure displayed is of a kind which may be dealt with by the user, e.g., sheet jam or run-out of toner, the user may correct the failure and then restart the recorder. However, since the other failure which is lower in the degree of priority than the one displayed is not corrected, the same failure is apt to be displayed when the recorder is restarted. Such a situation cannot be settled by the user. Even through the user may call a serviceman for repair, the serviceman may not be incapable of selecting adequate measure because the root failure does not come to the surface.

SUMMARY OF THE INVENTION

It is, therefore, an object of the present invention to provide a control device for an image recorder which eliminates the drawbacks particular to the prior art as discussed above.

It is another object of the present invention to provide a control device for an image recorder which helps a user or a serviceman take adequate measures when a failure has occurred in the image recorder.

It is another object of the present invention to provide a generally improved control device for an image recorder.

A control system for an image recorder of the present invention comprises a failure detecting means for detecting various kinds of failures which occur in the image recorder, a photoconductive element replacement detecting means for detecting replacement of a photoconductive element used in an image-forming process, a print number counter means for counting a number of prints produced by individual photoconductive elements, a non-volatile history data storing means for storing history data which comprise counts output by the print number counter means and corresponding to the individual photoconductive elements, and a cumulative value of detection outputs of the failure detecting means which are produced when any of the photoconductive elements is in use, and a display means for displaying contents stored in the history data store means.

The above and other objects, features and advantages of the present invention will become more apparent from the following detailed description taken with the accompanying drawings.

DESCRIPTION OF THE PREFERRED EMBODIMENT

Figure 1:
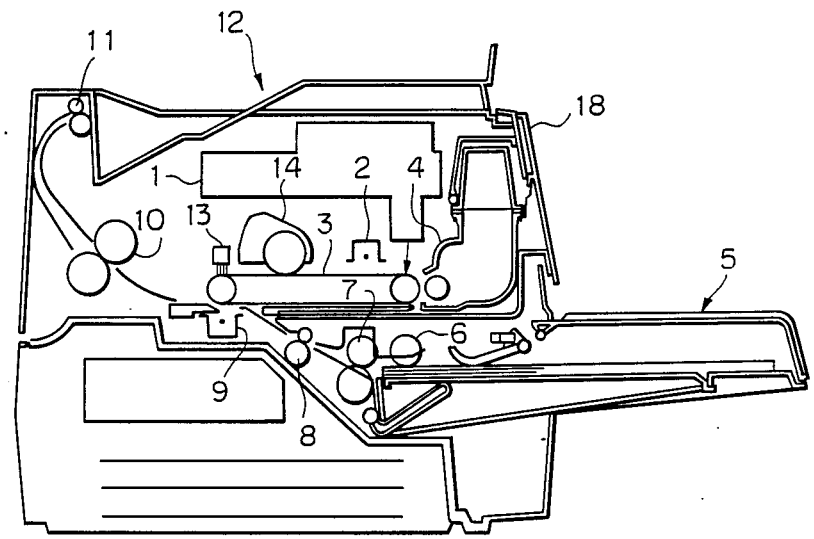
FIG. 1 is a schematic view of a laser printer to which one embodiment of the present invention is applied.

Referring to FIG. 1 of the drawings, a laser printer which uses the invention is shown. As shown, the laser printer includes an optical system, or optics, 1 for emitting a laser beam which is modulated by a video signal, or raster data, corresponding to an image to be recorded. The laser beam illuminates a photoconductive belt 3 whose surface has been uniformly charged, whereby a latent image is electrostatically formed on the belt 3. The latent image is developed by a developing unit to become a toner image. Paper sheets stacked on a tray 5 are fed by feed rollers and separated one by one by separator rollers 7. Then, each paper sheet is driven by register rollers 8 toward the belt 3 at such a timing that its leading end aligns with that of the toner image. The toner image is transferred from the belt 3 to the paper sheet which is held in close contact with the belt 3 by a transfer charger 9. Subsequently, the toner image on the paper sheet is fixed by fixing rollers 10 and, then, driven out of the laser printer toward a tray 12. The charge remaining on the belt 3 after the image transfer is removed by a discharging unit 13 while, at the same time, the toner remaining on the belt 3 is removed by a cleaner 14.

Figure 2:
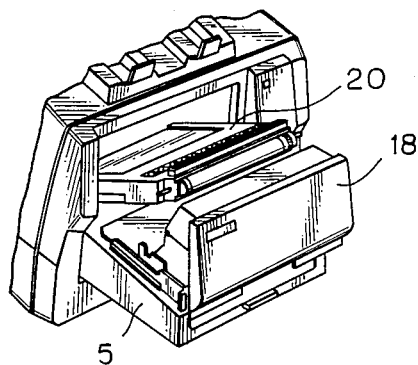
FIG. 2 is a perspective view showing how a photoconductive element unit is replaced.

As shown in FIG. 2, an upper portion 18 of the tray 5 may be pulled out to replace a photoconductive element unit 20 in which the belt 3 is accommodated together with other parts and elements which surround the belt 3. The time of replacement depends upon the number of prints produced because the life of the belt 3 expires when about 10,000 prints are produced.

Figure 3:
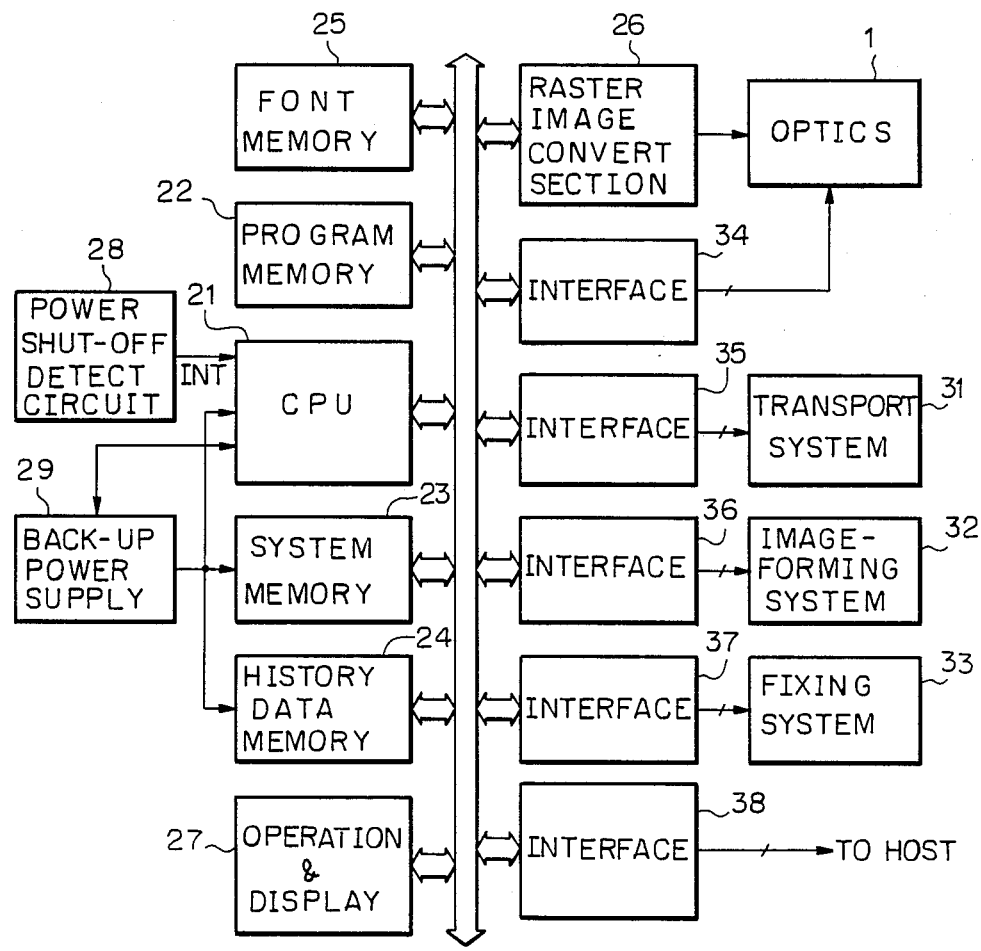
FIG. 3 is a block diagram showing a specific control system.

Referring to FIG. 3, a control system installed in the laser printer is shown and includes a CPU (central processing unit) 21 which functions to control various sections of the printer. A control program of the CPU 21 is stored in a program memory 22 which may be implemented by a ROM (read only memory) by way of example. A work area of the CPU 21 is provided in a system memory 23. A history data memory 24 comprises a non-volatile and programable memory such as a NOV-RAM (non-volatile random access memory) or an EEPROM (electrically erasable programable memory) and is adapted to store various kinds of history data, as will be described.

A font memory 25 serves to generate graphic data corresponding to character data. A raster image converting section 26 functions to convert the graphic data into raster data which is transferred to the optical system 1 to modulate a laser beam. An operation and display section 27 includes various kinds of keys and displays which are necessary for the operation of the laser printer. A power shut-off detecting circuit 28 is responsive to the interruption of a power supply, feeding its output, or interrupt signal, INT to an interrupt signal input terminal of the CPU 21. A back-up power supply section 29 is used to supply the system memory 23 and history data memory 24 with operating power for a predetermined period of time, e.g. 1 second.

The optical system 1, a transport system 31 made up of the feed rollers 6 and others, an image-forming system 32 made up of the belt 3 and others, and a fixing system made up of the fixing rollers 10 and others interchange various kinds of signals with the CPU 21 via interfaces 34, 35, 36 and 37, respectively. For example, while the CPU 21 delivers operation signals and the like to the respective systems, the respective systems send to the CPU 21 output signals of various sensors responsive to the statuses of the individual systems, failure detection signals, etc. Further, the CPU 21 interchange predetermined data with a host machine via an external interface 38.

The CPU 21 detects various failures such as a sheet jam in the paper feed section, a sheet jam in the transport section, a sheet jam in the paper discharge section, and a failure of a main motor in response to output signals of various sensors of the transport system 31. Also, the CPU 21 detects failures such as run-out of toner and failures of chargers in response to output signals of various sensors of the image-forming system 32. Further, the CPU 21 detects failures such as a one of a heater in response to output signals of various sensors of the fixing system 33. All such detections are performed at suitable time intervals.

A mechanically resettable counter is provided for counting the number of prints as produced by the belt 3. When the photoconductive element unit 20 is received in a predetermined position inside of the laser printer, the counter is reset by a pawl which protrudes from the unit 20. The pawl is in turn snapped when it resets the counter. Since the counter is reset to zero with the pawl snapped every time the photoconductive elment unit 20 is replaced as stated above, the same unit 20 may be mounted and dismounted as desired without resetting the counter. In an initializing step which is performed at the start of recording operation, the CPU 21 sees if the count of the counter is zero and, if it is zero, decides that the photoconductive element unit 20 has been replaced. The CPU 21 delivers a count-up signal to the counter.

Figure 4:
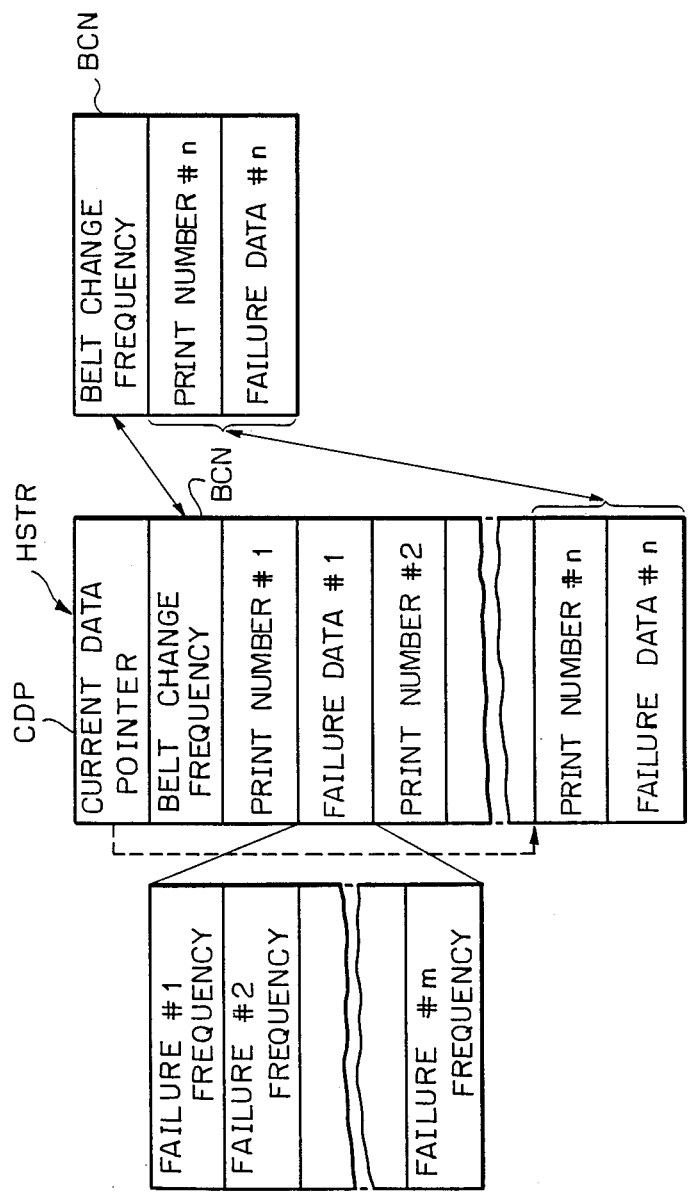
FIG. 4 shows an arrangement of signals representative of exemplary history data.

As shown in FIG. 4, the history data memory 24 stores history data HSTR. As shown, the history data HSTR is made up of a current data pointer CDP representative of the head address of an area in which data associated with the belt 3 currently used is stored, a belt change number BCN representative of the frequency of replacement of the belt performed, a print number #1 representative of the number of prints produced by the first belt 3, failure data #1 representative of the number of various kinds of failures which occurred while the first belt 3 is used, a print number #2 representative of the number of prints produced by the second belt 3, . . . , a print number #n representative of the number of prints produced by the "n" belt 3, i.e., the belt 3 currently used, and failure data #n representative of the number of various kinds of failures occurred while the "n" belt 3 is used. Hence, the current data pointer CDP is indicative of the head address of the print number #n. As regards the failure data, the frequencies of m different kinds of failures, i.e., failures #1 to #m are arranged in sequence. It is to be noted that these failures are the failures which are detected by the previously stated failure detection processing.

In the initializing step, the CPU 21 picks up, among the history data HSTR, those data which possibly need rewriting, i.e., the belt change number BCN and the print number #n and failure data #n associated with the belt 3 currently used. These data picked up are copied in a predetermined area of the system memory 23. When the count of the counter as detected by the CPU 21 at the initialization is zero, meaning that the photoconductive element unit 20 has been replaced, the belt change number BCN is incremented by 1 while, at the same time, a print number #(n+1) whose value is zero and blank failure data #(n+1) are provided in areas immediately after the failure data #n and the next head address of the area of the print number #(n+1) is updated with the content of the current data pointer CDP. Also, the belt change number BCN and the print number #(n+1) and failure data #(n+1) of the updated data are copied in the system memory 23.

While the laser printer is in operation, the print number #n and the failure data #n (or print number #(n+1) and failure data #(n+1)) are updated. In this instance, during the interval between the occurrence of a failure and the restoration of the printer to normal, the number of occurrences of the same failure is not updated. This is to prevent the number of occurrences from being updated when the user turns on and off the power of the printer or resets the printer without performing necessary work.

When the power supply is shut off by a certain cause, the power shut-off detecting circuit 28 delivers an interrupt signal INT to the CPU 21 which then executes interruption processing. In the interruption processing, the CPU 21 starts the back-up power supply section 29 to apply back-up power to the CPU 21, system memory 23, and history data memory 24 and, then, rewrites the data stored in the history data memory 24 in response to the belt change number BCN and the print number #n and failure data #n (or printer number #(n+1) and failure data #(n+1)). Hence, the back-up power supply section 29 needs only a capacity sufficient to back up the CPU 21, system memory 23, and history data memory 24 for a period of time which is long enough for the CPU 21 to surely execute the interruption processing.

As the user or the serviceman commands the display of history data on the operation and display section 27, the CPU 21 sequentially shows on the display of the section 27 the history data which are stored in the history data memory 24. The history data may be read out and printed out as desired, by entering a print-out command. Further, only a part of the history data which the user or the serviceman desires may be printed out. In addition, the history data may be transferred to the host machine via the external interface 38.

While the present invention has been shown and described in relation to a laser printer, it is similarly applicable to any other kind of recorder.

In summary, it will be seen that the present invention provides a control system for an image recorder which helps a user or a serviceman take an adequate measure when a failure occurs in the image recorder.

Various modifications will become possible for those skilled in the art after receiving the teachings of the present disclosure without departing from the scope thereof.

What is claimed is:

1. A control system for an image recorder having components including a replaceable photoconductive element and means for feeding sheets to the photoconductive member to thereby print images on said sheets comprising:
   first detecting means for detecting selected kinds of failures in the operation of selected ones of said components and for providing failure signals related to the detected failures;
   second detecting means for detecting the replacement of said photoconductive member in said image recorder and for providing replacement signals indicative of the replacement of said photoconductive member;

a counter counting the number of sheets fed to said photoconductive member and for providing a corresponding count signals;

a history data memory coupled to said first and second detecting means and to said counter to receive said failure signals, said replacement signals and said count signals and to store history data related to (i) the frequency of the replacement of photoconductive members; (ii) the respective number of sheets fed to each of a plurality of photoconductive members used in said image recorder, including the current photoconductive member and at least one previously used and now replaced photoconductive member; (iii) the number of failures of components which have occurred for each different photoconductive member comprised within said plurality of photoconductive members used in said image recorder; and (iv) the frequency of occurrence of each different kind of a selected plurality of kinds of failures; and display means coupled to said history data storing means for selectively displaying at any one time selected subsets of the history data stored therein.

2. A control system as in claim 1 in which said history data memory is a non-volatile memory which retains its contents in the case of a failure in the supply of external electrical power to said image recorder, and including means responsive to the interruption and resumption of the supply of external electrical power to said control system to prevent changes in said history data upon resumption of said supply of external electrical power unless such changes are due to a replacement of said photoconductive member in the interval between the interruption and resumption of said external electrical power or the failure of a component in said interval.

* * * * *